United States Patent
Sakamoto et al.

(10) Patent No.: US 10,526,979 B2
(45) Date of Patent: Jan. 7, 2020

(54) GAS TURBINE WITH AN AIR BLEEDER TUBE

(71) Applicant: MITSUBISHI HITACHI POWER SYSTEMS, LTD., Yokohama-shi, Kanagawa (JP)

(72) Inventors: Yasuro Sakamoto, Tokyo (JP); Eisaku Ito, Tokyo (JP); Susumu Wakazono, Tokyo (JP); Koichi Ishizaka, Hyogo (JP); Yukinori Machida, Tokyo (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 339 days.

(21) Appl. No.: 15/479,895

(22) Filed: Apr. 5, 2017

(65) Prior Publication Data

US 2017/0204788 A1    Jul. 20, 2017

Related U.S. Application Data

(62) Division of application No. 13/977,172, filed as application No. PCT/JP2012/052084 on Jan. 31, 2012, now Pat. No. 9,650,966.

(30) Foreign Application Priority Data

Feb. 25, 2011  (JP) .................................. 2011-039204

(51) Int. Cl.
*F02C 9/18* (2006.01)
*F02C 9/52* (2006.01)
(Continued)

(52) U.S. Cl.
CPC .............. *F02C 9/18* (2013.01); *F01D 25/305* (2013.01); *F02C 7/06* (2013.01); *F02C 7/20* (2013.01);
(Continued)

(58) Field of Classification Search
CPC ...... F02C 9/18; F02C 9/52; F02C 7/06; F02C 7/20; F01D 25/28; F01D 25/305
(Continued)

(56) References Cited

U.S. PATENT DOCUMENTS 4,574,584 A * 3/1986 Hovan .................. F01D 25/125
                                                              184/6.11
5,076,049 A   12/1991 Von Benken et al.
(Continued)

FOREIGN PATENT DOCUMENTS

CN      1626877 A    6/2005
JP      06-60738 U   8/1994
(Continued)

OTHER PUBLICATIONS

Extended (supplementary) European Search Report dated Nov. 6, 2017, issued in counterpart European Application No. 12748987.0. (9 pages).
(Continued)

*Primary Examiner* — Steven M Sutherland
(74) *Attorney, Agent, or Firm* — Westerman, Hattori, Daniels & Adrian, LLP

(57) ABSTRACT

A gas turbine provided with an air bleeder tube (1) that, during startup, bleeds a portion of the compressed air of a compressor from the compressor and discharged the bled air into a cylindrical exhaust duct (20), wherein the air bleeder tube (1) is disposed at a portion that does not obstruct the flow of the main flow of combustion gas.

1 Claim, 7 Drawing Sheets

(51) Int. Cl.
  *F02C 7/20* (2006.01)
  *F02C 7/06* (2006.01)
  *F01D 25/30* (2006.01)
  *F02C 7/268* (2006.01)

(52) U.S. Cl.
  CPC ............... *F02C 7/268* (2013.01); *F02C 9/52* (2013.01); *F05D 2220/32* (2013.01); *F05D 2250/12* (2013.01); *F05D 2260/606* (2013.01)

(58) Field of Classification Search
  USPC .......................................... 60/785, 782, 795
  See application file for complete search history.

(56) References Cited

U.S. PATENT DOCUMENTS

| | | | |
|---|---|---|---|
| 5,134,844 A | 8/1992 | Lee et al. | |
| 5,265,408 A | 11/1993 | Sheoran et al. | |
| 5,340,274 A | 8/1994 | Cunha | |
| 6,532,744 B1 | 3/2003 | Reiter et al. | |
| 2007/0025847 A1 | 2/2007 | Wakazono et al. | |
| 2009/0320496 A1 | 12/2009 | Faulder et al. | |
| 2009/0324386 A1 | 12/2009 | Takamura et al. | |
| 2010/0043447 A1* | 2/2010 | Kirby | F01D 17/105 60/785 |
| 2010/0180573 A1* | 7/2010 | Ruston | F02K 3/075 60/226.3 |

FOREIGN PATENT DOCUMENTS

| | | |
|---|---|---|
| JP | 2004-190664 A | 7/2004 |
| JP | 2010-203256 A | 9/2010 |
| WO | 2006/091142 A1 | 8/2006 |

OTHER PUBLICATIONS

International Search Report dated Feb. 28, 2012, issued in counterpart application No. PCT/JP2012/052084.

Written Opinion dated Feb. 28, 2012, issued in counterpart application No. PCT/JP2012/052084.

Office Action dated Feb. 2, 2015, issued in counterpart Chinese Patent Application No. 201280004336.4, with English translation (12 pages).

* cited by examiner

GAS TURBINE WITH AN AIR BLEEDER TUBE

CROSS-REFERENCE TO RELATED APPLICATIONS

This application is a divisional of copending U.S. patent application Ser. No. 13/977,172, filed on Oct. 28, 2013, and wherein U.S. patent application Ser. No. 13/977,172 is a National Stage application filed under 35 U.S.C. § 371 of International Application No. PCT/JP2012/052084, filed on Jan. 31, 2012, and which is based upon and claims the benefit of priority under 35 U.S.C. § 119(a) of Japanese Patent Application No. 2011-039204, filed on Feb. 25, 2011, the entire contents of which are incorporated herein by reference.

FIELD OF THE INVENTION

The present invention relates to a gas turbine.

BACKGROUND OF THE INVENTION

In the conventional gas turbine, it has been known a portion of compressed air bled from a compressor and a bled air is discharged into an exhaust duct through an air bleeder tube (for example, Patent Document 1 as described below).

FIG. 7 is a schematic view for showing one example of a conventional gas turbine. As shown in FIG. 7, the conventional gas turbine comprises a rotor 10 for rotating around a rotational axis, a plurality of rotor blades 11 circularly mounted at the rotor 10, a turbine casing 12 for surrounding and covering the rotor 10, a plurality of stator blades (not shown) mounted on the turbine casing 12, wherein the plurality of the rotor blades 11 and the plurality of the stator blades are alternatively arranged along the rotational axis. As shown as an arrow F in FIG. 7, the main flow of the combustion gas 13 is directed among them. Each rotor blade 11 and each stator blade are made as one pair. These pairs make a multi stage structure. FIG. 7 shows the rotor blade of the last stage located at the lower most side with respect to the main flow.

At the downstream side of the last rotor blade 11 with respect to the main flow, an exhaust diffuser 14 is coaxially connected. The exhaust diffuser 14 of which an inside is connected to the main flow of the combustion gas 13 comprises an exhaust casing 16 of which an inside forms a main flow of combustion gas 15 of which a cross sectional area is gradually enlarged along the direction of the main flow, a plurality of struts for surrounding and supporting a bearing 17 for supporting the rotor passed through the inside of the exhaust casing and manholes 19 in which an operator walks for a checking operation and a maintenance operation. At the downstream side of the exhaust diffuser 14 with respect to the main flow, a cylindrical exhaust duct 20 is coaxially connected.

In the conventional gas turbine, an air bleeder tube 100 is arranged inside of an exhaust duct 20.

PRIOR ART DOCUMENT

Patent Document

Patent Document 1: Japanese Utility Model Unexamined Publication No. 6-60738

SUMMARY OF THE INVENTION

Subject to be Solved by the Invention

However, the air bleeder tube 100 as described above is located in the exhaust duct 20. The air bleeder tube 100 obstructs the main flow of combustion gas as shown as an arrow F in FIG. 7. Thus, a ratio of the pressure loss is increased in the exhaust duct 20. As the result, a performance of the gas turbine is reduced.

Upon reviewing the above drawback, a purpose of the present invention is to provide a gas turbine so as to improve a startup performance of a compressor at a startup timing, wherein a portion of the compressed air is bled from the compressor and the compressed air is discharged into an exhaust duct by an air bleeder tube of which a position does not obstruct the main flow of the combustion gas.

Means to Solve the Subject

To resolve the above subject, a gas turbine according to the first invention comprises a compressor and an air bleeder tube, wherein a portion of compressed air is bled from the compressor at a startup timing and the compressed air is discharged into an exhaust duct through the air bleeder tube. The gas turbine according to the first invention is characterized in that a main flow of combustion gas is not obstructed by an arrangement of the air bleeder tube.

To resolve the above subject, a gas turbine according the second invention is characterized in that the air bleeder tube is passed through an inside of an structural element connected to a bearing for supporting a rotor.

To resolve the above subject, a gas turbine according to the third invention is characterized in that the air bleeder tube is arranged at a portion immediately near a downstream end of a structural element connected to a bearing for supporting a rotor along the main flow of combustion gas.

To resolve the above subject, a gas turbine according to the fourth invention is characterized in that an outlet of the air bleeder tube is arranged at a lower outer peripheral portion of a structural element connected to a bearing for supporting a rotor.

To resolve the above subject, a gas turbine according to the fifth invention is characterized of further comprising three structure elements connected to a bearing for supporting a rotor, wherein the three structural elements are arranged in an invert Y shape along a peripheral direction of a rotor and the air bleeder tube is passed through an inside of the structural elements.

To resolve the above subject, a gas turbine according to the sixth invention is characterized in that the exhaust duct is a cylindrical shape and a rectangular exhaust duct of which a rectangular cross section is connected to a lower end of the exhaust duct and the air bleeder tube may be arranged at each corner out of four corners of the rectangular shape of an inlet end of the rectangular exhaust duct.

Effect of the Invention

According to the present invention, in order to improve a startup performance of a compressor at a startup timing, a portion of compressed air is bled from the compressor and the compressed air is discharged into a cylindrical exhaust duct, wherein an air bleeder tube is disposed at a portion that does not obstruct the main flow of combustion gas.

EMBODIMENTS OF THE INVENTION

Hereinafter, embodiments of a gas turbine according to the present invention will be described with reference to the accompanying drawings.

Embodiment 1

Hereinafter, the first embodiment of the gas turbine according to the present invention will be described.

Figure 1:
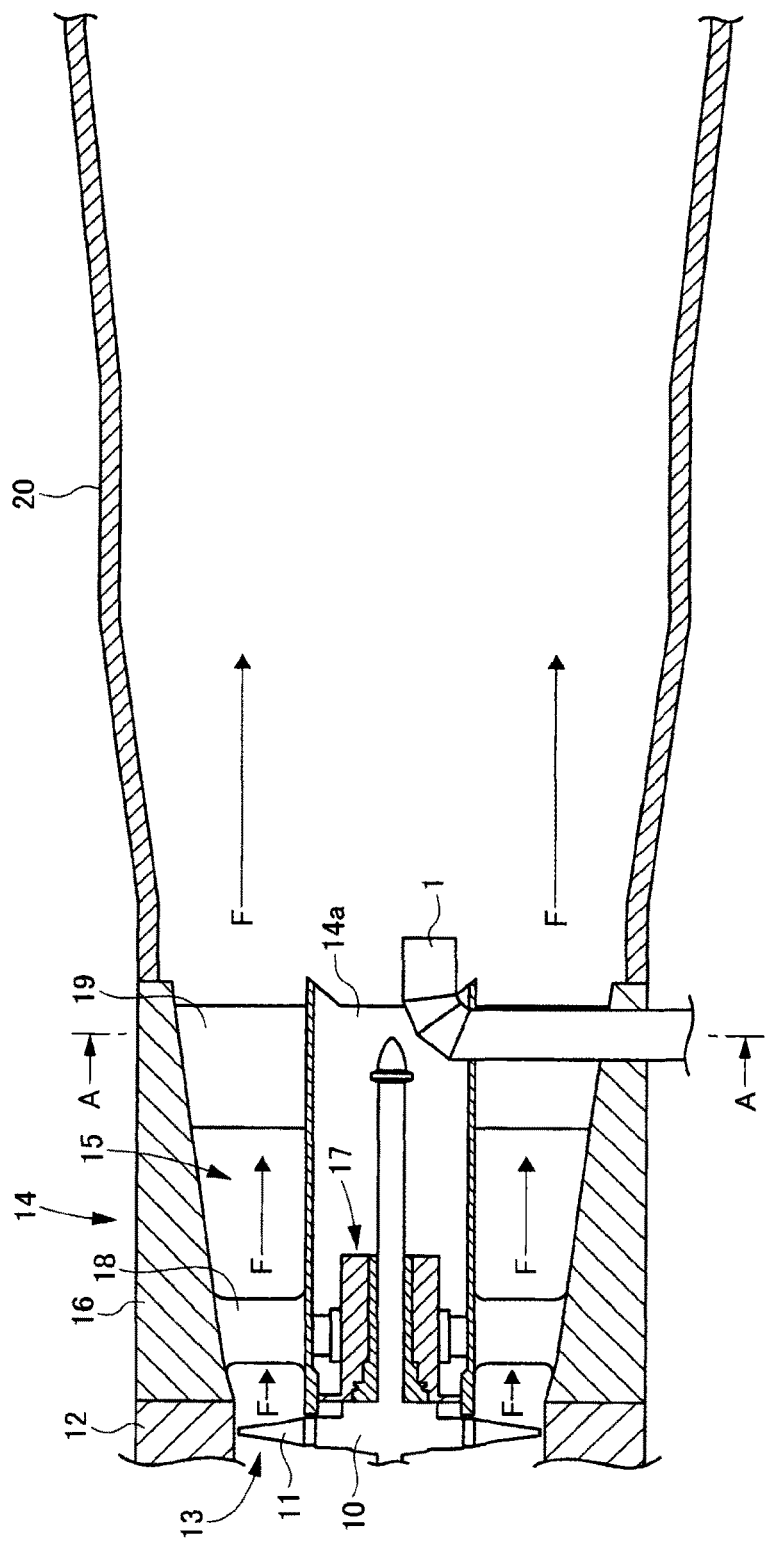
FIG. 1 is a schematic view of a structure of a gas turbine according to the first embodiment of the present invention.

FIG. 1 is a schematic view of a structure of the first embodiment of the gas turbine according to the present invention.

As shown in FIG. 1, the gas turbine according to the first embodiment comprises a rotor 10 for rotating around a rotation axis, a plurality of rotor blades 11 circularly arranged along an outer peripheral surface, a turbine casing 12 for surrounding and covering the rotor 10 and a plurality of stator blades (not shown) arranged at an inner surface of the turbine casing 12, wherein the rotor blades and the stator blades are alternatively arranged along the axial direction of the rotation axis. As shown in an arrow F in FIG. 1, the main flow of the combustion gas 13 is passed through therebetween. Each rotor blade and each stator blade are formed as one pair along the axial direction. A multi stage structure is formed by a plurality of pairs of the rotor blades and the stator blades. FIG. 1 shows only a rotor blade of the last stage in the multi stage structure. The rotor blade as shown in FIG. 1 is located at the lowermost side with respect to a direction of the main flow 13.

At the downstream side of the rotor blade with respect to the direction of the main flow, a rotor blade 11 of the last stage is coaxially connected to an exhaust diffuser 14. The exhaust diffuser 14 comprises an exhaust casing 16 of which a cross sectional area is gradually enlarged along the direction of the main flow is formed as a flow of the combustion gas 15 continued to the main flow of the combustion gas 13, a plurality of struts 18 for surrounding with and supporting a bearing 17 for supporting the rotor 10 passed through the exhaust casing 16 and manholes 19 in which an operator can walk for a check operation and a maintenance operation. At the downstream side of the exhaust diffuser 14 with respect to the direction of the flow, a cylindrical exhaust duct 20 is coaxially connected to the exhaust diffuser 14.

The first embodiment of the gas turbine provides an air bleeder tube 1 for bleeding a portion of the compressed air from a compressor (not shown) and discharging the compressed air into the exhaust duct 20 so as to improve a startup performance of the compressor at a startup timing.

In the gas turbine according to the first embodiment, the air bleeder tube 1 is located at a position where the air bleeder tube 1 does not obstruct the main flow of the combustion gas. Thus, the bleeder tube 1 is passed through an inside of the manhole 19 and an outlet of the air bleeder tube 1 is arranged in an inner diameter portion 14a of the exhaust diffuser 14 and directed toward the downstream of the main flow. In the first embodiment, the air bleeder tube 1 is passed through the inside of the manhole 19. However, the air bleeder tube 1 may be passed though an inside of the strut 18. Alternatively, the air bleeder tube 1 may be passed through an existing member connected to the bearing 17 for supporting the rotor 10 except the members described above.

Accordingly, in accordance with the gas turbine according to the first embodiment, the main flow of combustion gas is not obstructed in the exhaust duct 20 so that an increase of the pressure loss in the exhaust duct 20 can be saved and the performance of the gas turbine can be improved.

Embodiment 2

Hereinafter, the second embodiment of the gas turbine of the present invention will be described.

Figure 2:
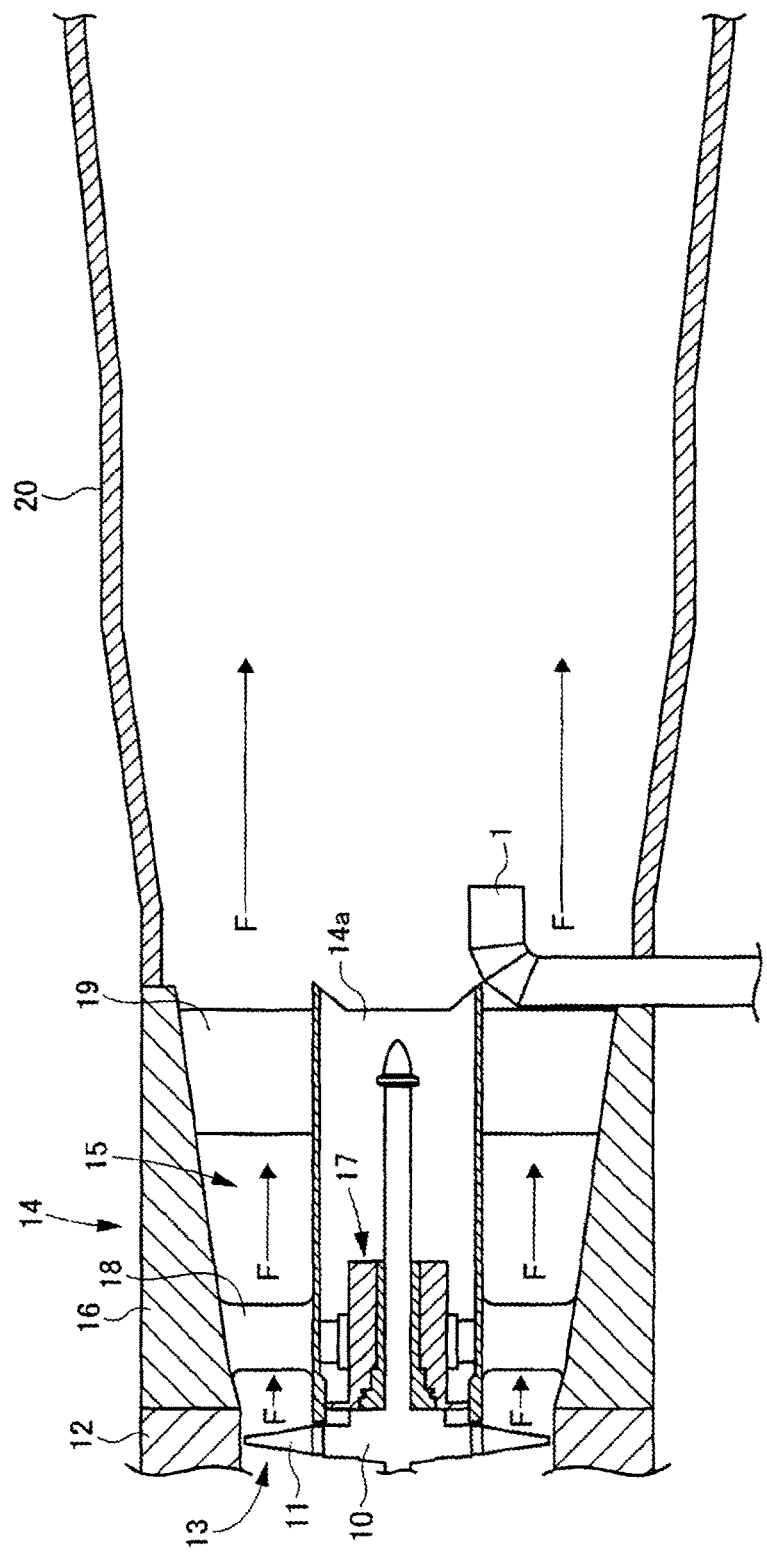
FIG. 2 is a schematic view of a structure of a gas turbine according to the second embodiment of the present invention.

FIG. 2 is a schematic view of a structure of the gas turbine according to the second embodiment.

As shown in FIG. 2, the gas turbine according to the second embodiment has a structure similar to the structure of the first embodiment except an air bleeder tube 1 located at a position immediately near the downstream side of a manhole 19 with respect to the direction of the flow not so as to obstruct the main flow of the combustion gas.

Accordingly, in accordance with the gas turbine of the second embodiment, the main flow of the combustion in the exhaust duct 20 is not obstructed so that an increase of the pressure loss in the exhaust duct 20 can be saved and the performance of the gas turbine can be improved.

Embodiment 3

Hereinafter, the third embodiment of the gas turbine of the present invention will be described.

Figure 3:
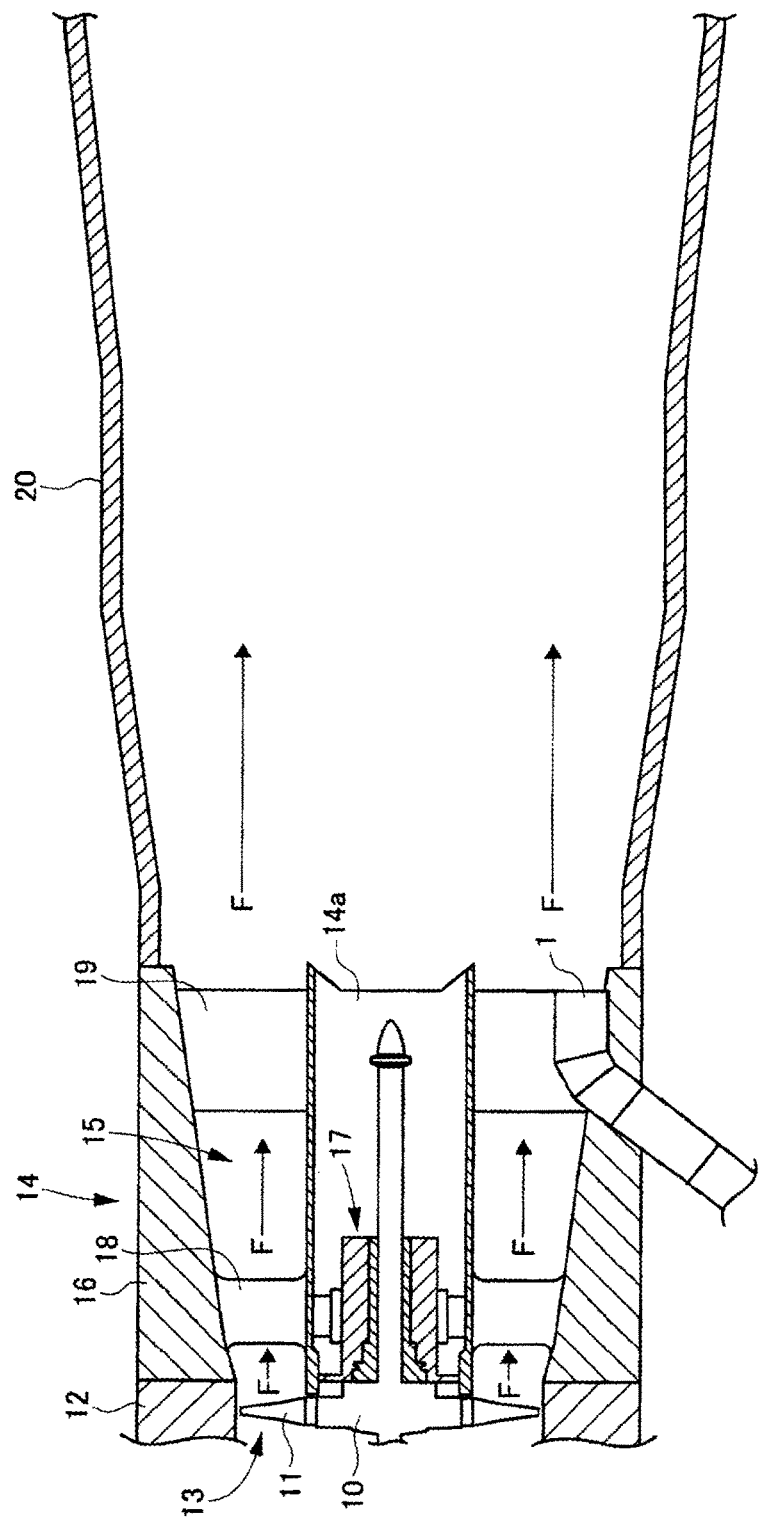
FIG. 3 is a schematic view of a structure of a gas turbine according to the third embodiment of the present invention.

FIG. 3 is a schematic view of a structure of the gas turbine according to the third embodiment.

As shown in FIG. 3, the gas turbine according to the third embodiment has a structure similar to the structure of the first embodiment except an outlet of air bleeder tube 1 located at a downstream outer edge of a manhole 19 with respect to the rotation axis not so as to obstruct the main flow of the combustion gas.

Accordingly, in accordance with the gas turbine of the third embodiment, the main flow of the combustion gas in the exhaust duct 20 is not obstructed so that an increase of the pressure loss in the exhaust duct 20 can be saved and the performance of the gas turbine can be improved.

In the third embodiment, the air bleeder tube 1 is bent at an obtuse angle so as to reduce the pressure loss although the air bleeder tube 1 according to the first and second embodiments is bent at a right angle. Thereby, a proper amount of compressed air can be bled from a compressor at startup timing so that a startup performance of the compressor can be improved.

Embodiment 4

Hereinafter, the fourth embodiment of the gas turbine of the present invention will be described.

In order to improve the startup performance of the compressor at the startup timing, the gas turbine of the fourth embodiment comprises a large diameter low pressure air bleeder tube 1 (hereinafter, it is referred as "low pressure air bleeder tube") connected to a front stage and an intermediate stage of the compressor, and a middle pressure air bleeder tube 1 (hereinafter, it is referred as "middle pressure air bleeder tube") and a small diameter high pressure air bleeder tube 1 (hereinafter, it is referred as "high pressure air bleeder tube") connected to a rear stage of the compressor.

Figure 4:
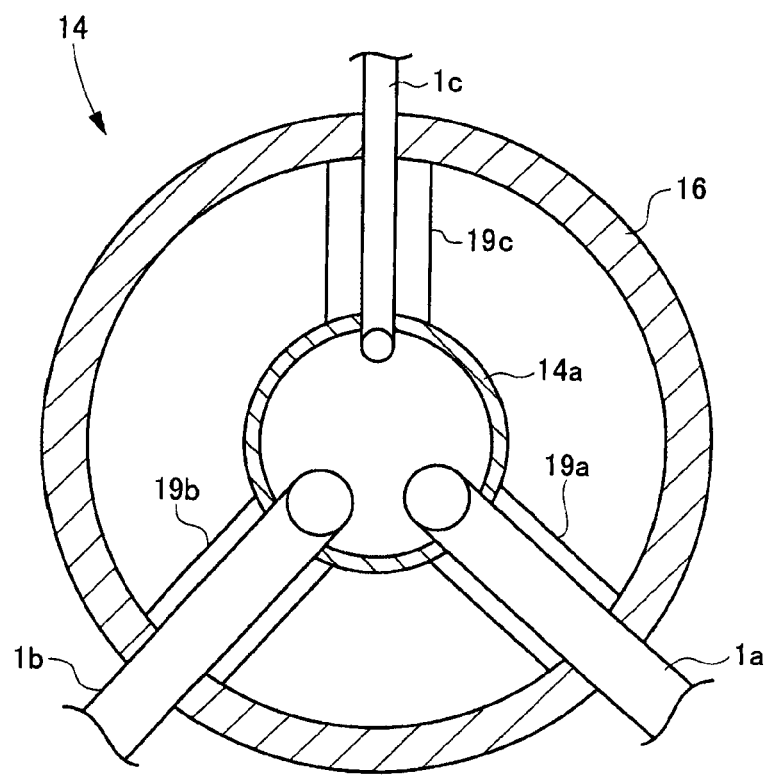
FIG. 4 is a cross sectional view of the structure of the gas turbine according to the fourth embodiment of the present invention taken a line along A-A in FIG. 1.

FIG. 4 is a cross sectional view of the structure of the gas turbine according to the fourth embodiment of the present invention taken a line along A-A in FIG. 1.

As shown in FIG. 4, the structure of the gas turbine of the fourth embodiment is similar to the structure of the first embodiment except manholes 19 arranged in an inverted Y shape, wherein the large diameter low pressure air bleeder tube 1a and the large diameter middle pressure air bleeder tube 1b is passed through two lower side manholes 19a, 19b, respectively and the small diameter high pressure air bleeder tube 1 is passed through a upper side manhole 19c.

Thus, in the two lower manholes 19a, 19b into which an operator can access smoothly and in which an operator can work easily, the large diameter low pressure air bleeder tube 1a and the large diameter middle pressure air bleeder tube 1b is passed through, respectively. In the upper manhole in which an operator cannot work easily, the small diameter air bleeder tube 1c is passed through. As the result, a productive efficiency for manufacturing a gas turbine can be improved.

Although the small diameter high pressure air bleeder tube 1c is passed through the upper manhole 19c in the fourth embodiment, a small diameter high pressure air bleeder tube 1c may be passed through a redundant space in the two lower manholes 19a, 19b in the case that the small diameter high pressure air bleeder tube 1c can be passed through the redundant space in the two lower manholes 19a, 19b. Although three air bleeder tubes 1 are arranged in the fourth embodiment, one air bleeder tube 1 or a plurality of air bleeder tubes 1 such as two, four or more than may be arranged.

In the conventional gas turbine, if a plurality of air bleeder tubes 1 such as the large diameter low pressure air bleeder tube 1a, the large diameter middle pressure air bleeder tube 1b and the small diameter high pressure air bleeder tube 1c are arranged, the main flow of the combustion gas is obstructed by these air bleeder tubes 1 and the pressure loss is largely increased. On the contrary, in the gas turbine according to the present invention, even if the plurality of air bleeder tubes are arranged, the main flow of the combustion gas in the exhaust duct 20 is not obstructed by them. Thus, an increase of the pressure loss in the exhaust duct 20 can be saved and the performance of the gas turbine can be improved.

Embodiment 5

Hereinafter, the fifth embodiment of the gas turbine of the present invention will be described.

At the downstream end of the gas turbine with respect to the direction of the flow, an exhaust duct of which a cross sectional shape is a rectangular for connecting with a lower side equipment such as a boiler (hereinafter, it is referred as "a rectangular exhaust duct") may be provided.

Figure 5:
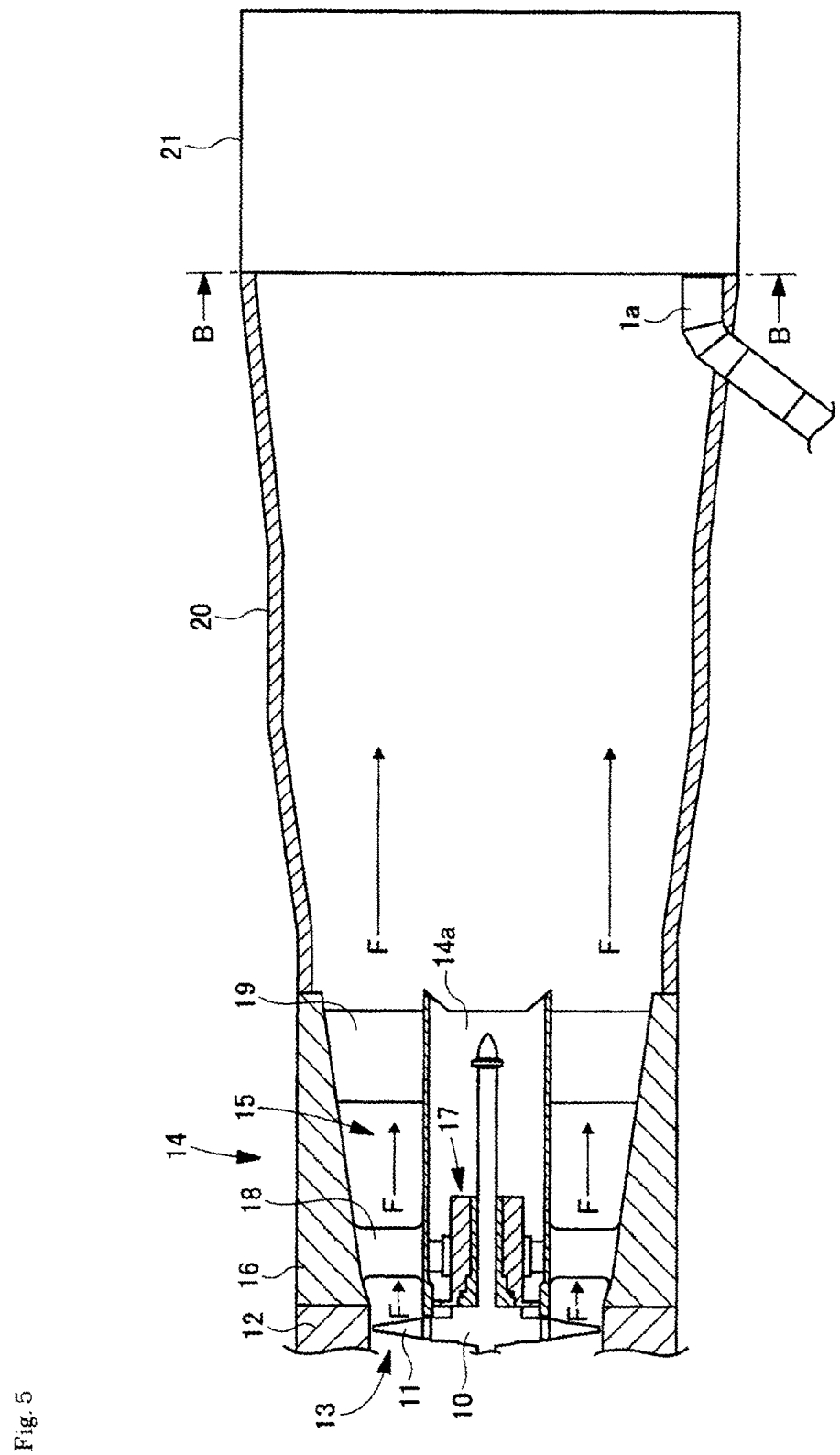
FIG. 5 is a schematic view of a structure of a gas turbine according to the fifth embodiment according to the present invention.
Figure 6:
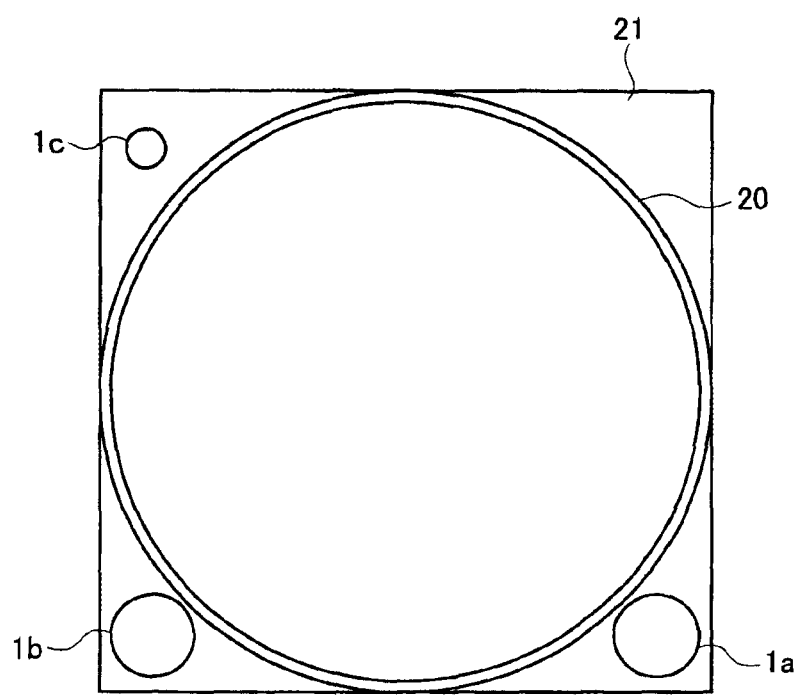
FIG. 6 is a cross sectional view of the structure of the gas turbine according to the fifth embodiment of the present invention taken a line in FIG. 5.
Figure 7:
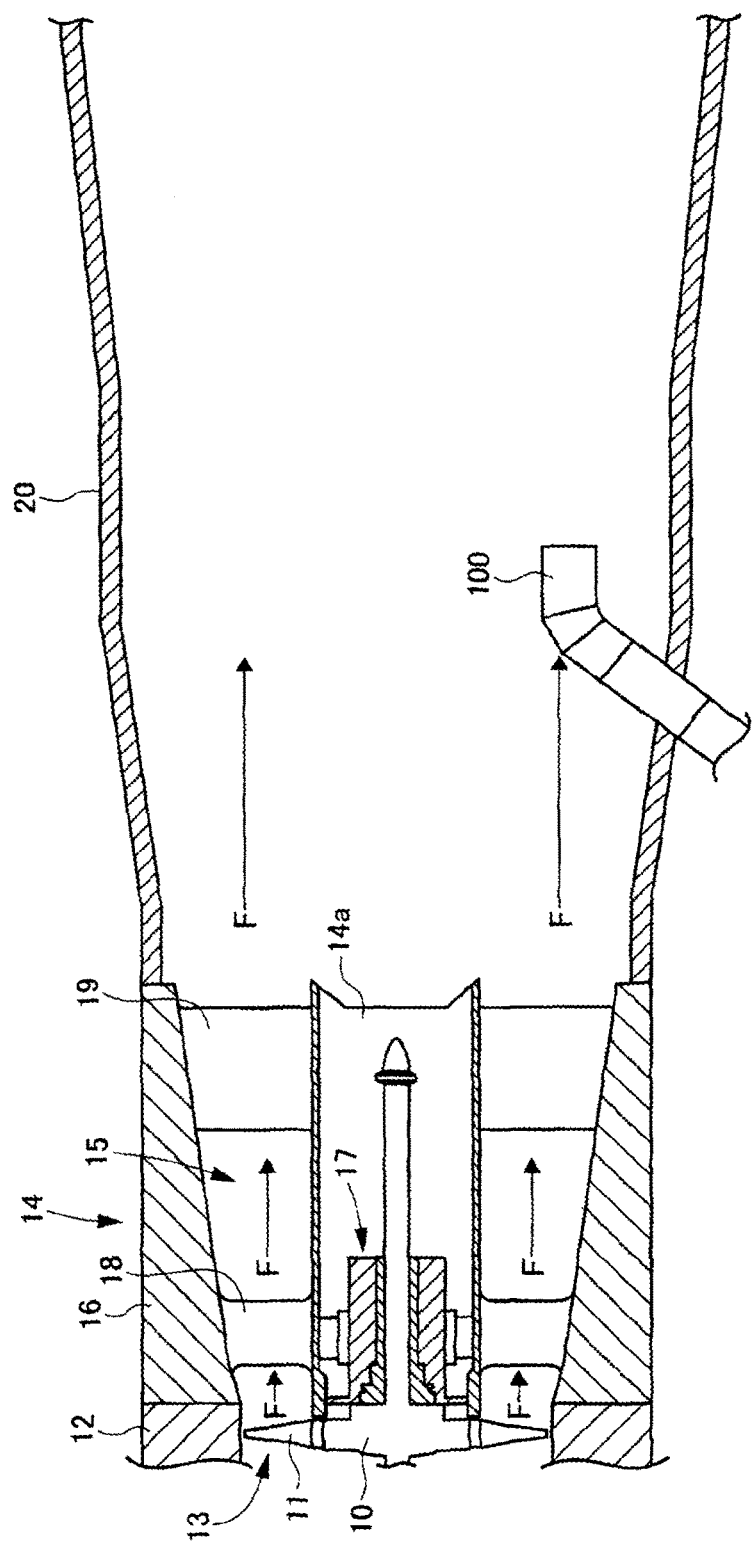
FIG. 7 is a schematic view of one example of a conventional gas turbine.

FIG. 5 is a schematic view of a structure of a gas turbine according to the fifth embodiment according to the present invention. FIG. 6 is a cross sectional view of the structure of the gas turbine according to the fifth embodiment of the present invention taken a line B-B in FIG. 5.

As shown in FIG. 5, a structure of the gas turbine according to the fifth embodiment is similar to that of the gas turbine according to the fourth embodiment except a rectangular exhaust duct 21 connected to the lower stream side of a cylindrical exhaust duct 20.

As shown in FIG. 6, in the gas turbine according to the fifth embodiment, two outlets for the large diameter low pressure air bleeder tube 1a and the large diameter middle pressure air bleeder tube 1b is provided at the both lower sides of the inlet side of the rectangular exhaust duct 21 and one outlet for the small diameter high pressure air bleeder tube 1c is provided at one upper side of the inlet side of the rectangular exhaust duct 21.

As described above, the outlets of the large diameter low pressure and middle pressure air bleeder tubes is arranged at the both lower sides of the inlet side of the rectangular exhaust duct 21 in which an operator can work relatively easily, respectively. The outlet of the small diameter high pressure air bleeder tube is arranged at the upper side of the inlet side of the rectangular exhaust duct 21 in which an operator cannot work easily. Thus, the productive efficiency for manufacturing the gas turbine can be improved.

Although the outlet of the small diameter high pressure air bleeder tube 1c is provided at a upper side corner of an inlet end of the rectangular exhaust duct 21 in the fifth embodiment, the small diameter high pressure air bleeder tube 1 may be passed through a redundant space of the outlets of the large diameter low pressure air bleeder tube 1a and the large diameter middle air bleeder tube 1b provided at the lower side corners of the inlet end of the rectangular exhaust duct 21, if such a redundant space is existed after arranged the both large diameter air bleeder tubes 1a and 1b. Although three air bleeder tubes 1 are provided in the fifth embodiment, it is possible to provide one air bleeder tube 1 or a plurality of air bleeder tubes 1 such as two or four or more than.

If a plurality of air bleeder tubes 1 such as the large diameter low pressure air bleeder tube 1a, the large diameter middle pressure air bleeder tube 1b and the small diameter high pressure air bleeder tube 1c are provided in a conventional gas turbine, a main flow of the combustion gas is obstructed by these air bleeder tubes 1. As the result, the pressure loss is largely increased. In accordance with the gas turbine according to the fifth embodiment, even if the plurality of air bleeder tubes are provided in the exhaust duct 20, the main flow of the combustion gas in the exhaust duct 20 is not obstructed by them. Thus, the increase of the pressure loss in the exhaust duct 20 can be saved and the performance of the gas turbine can be improved.

In the fifth embodiment, the large diameter low pressure air bleeder tube 1a, the large diameter middle pressure tube 1b and the small diameter high pressure air bleeder tube 1c are bent at an obtuse angle so as to reduce the pressure loss although the air bleeder tubes 1 according to the fourth embodiments are bent at a right angle. Thereby, a proper amount of compressed air can be bled from a compressor at a startup timing so that a startup performance of the compressor can be improved.

INDUSTRIAL USE OF THE INVENTION

In order to improve a startup performance of a compressor at startup timing, the present invention is applicable to a gas turbine comprising a compressor and an air bleeder tube, wherein a portion of compressed air is bled from the compressor and bled compressed air is discharged into an exhaust duct through the air bleeder tube.

EXPLANATION OF REFERENCE NUMERAL 1 air bleeder tube
1a low pressure air bleeder tube
1b middle pressure air bleeder tube
1c high pressure air bleeder tube
10 rotor
11 rotor blade
12 turbine casing
13 flow of combustion gas
14 exhaust diffuser
14a an inner diameter portion of an exhaust diffuser
15 flow of combustion gas
16 exhaust casing
17 bearing
18 strut
19 manhole
20 exhaust duct
21 rectangular exhaust duct
100 air bleeder tube

What is claimed is:

1. A gas turbine comprising:

a compressor;

an air bleeder tube;

a first exhaust duct; and a second exhaust duct, wherein a portion of compressed air is bled from said compressor at a startup timing and said compressed air is discharged into said second exhaust duct through said air bleeder tube, said gas turbine characterized in that a main flow of combustion gas is not obstructed by an arrangement of said air bleeder tube, and said first exhaust duct is a cylindrical shape, said second exhaust duct of which a rectangular cross section is positioned downstream from said first exhaust duct such that said second exhaust duct receives all of said combustion gas from said first exhaust duct and said air bleeder tube is arranged at a corner of an inlet end of said second exhaust duct.

* * * * *